US010343217B2

(12) United States Patent
Zhang et al.

(10) Patent No.: US 10,343,217 B2

(45) Date of Patent: Jul. 9, 2019

(54) NANOPARTICLE ENHANCEMENT FOR ADDITIVE MANUFACTURING

(71) Applicant: United Technologies Corporation, Farmington, CT (US)

(72) Inventors: Yan Zhang, Vernon, CT (US); Wayde R. Schmidt, Pomfret Center, CT (US)

(73) Assignee: United Technologies Corporation, Farmington, CT (US)

( * ) Notice: Subject to any disclaimer, the term of this patent is extended or adjusted under 35 U.S.C. 154(b) by 307 days.

(21) Appl. No.: 15/113,804

(22) PCT Filed: Jan. 12, 2015

(86) PCT No.: PCT/US2015/011061

§ 371 (c)(1),
(2) Date: Jul. 22, 2016

(87) PCT Pub. No.: WO2015/112366

PCT Pub. Date: Jul. 30, 2015

(65) Prior Publication Data

US 2016/0339520 A1 Nov. 24, 2016

Related U.S. Application Data

(60) Provisional application No. 61/931,325, filed on Jan. 24, 2014.

(51) Int. Cl.
*B22F 3/105* (2006.01)
*B33Y 10/00* (2015.01)
(Continued)

(52) U.S. Cl.
CPC .......... *B22F 3/1055* (2013.01); *B22F 1/0014* (2013.01); *B22F 7/02* (2013.01);
(Continued)

(58) Field of Classification Search
CPC ....... B33Y 10/00; B33Y 70/00; B22F 1/0014; B22F 3/1055; B22F 7/02; B22F 2998/10;
(Continued)

(56) References Cited

U.S. PATENT DOCUMENTS

| | | | |
|---|---|---|---|
| 2005/0276715 | A1 | 12/2005 | Voice |
| 2007/0290409 | A1 | 12/2007 | Brice et al. |

(Continued)

FOREIGN PATENT DOCUMENTS

| | | | |
|---|---|---|---|
| CN | 103521768 | A | 1/2014 |
| WO | WO2004/007124 | A1 | 1/2004 |

OTHER PUBLICATIONS

Che, et al., Thermal conductivity of carbon nanotubes, Nanotechnology 2000; 11:65-69 (Year: 2000).*

(Continued)

*Primary Examiner* — Daniel McCracken

(74) *Attorney, Agent, or Firm* — Kinney & Lange, P.A.

(57) ABSTRACT

A method for manufacturing a component includes providing a metallic first powder having a plurality of first particles with a first mean particle diameter. A second powder added to the first powder has a plurality of second particles with a second mean particle diameter less than the first mean particle diameter. Energy is applied to at least the second powder so as to selectively heat the second particles. The first powder is combined with the heated second powder to form a modified powder including modified powder particles. Modified powder particles have an interior portion containing an interior composition, and an outer surface portion with an outer composition different from the interior composition.

18 Claims, 4 Drawing Sheets

(51) Int. Cl.

| | |
|---|---|
| ***B23K 26/342*** | (2014.01) |
| ***B23K 26/00*** | (2014.01) |
| ***B22F 7/02*** | (2006.01) |
| ***B23K 15/00*** | (2006.01) |
| ***B33Y 70/00*** | (2015.01) |
| ***B22F 1/00*** | (2006.01) |
| ***C22C 26/00*** | (2006.01) |
| ***C22C 32/00*** | (2006.01) |
| *B82Y 40/00* | (2011.01) |
| *B29C 64/153* | (2017.01) |

(52) U.S. Cl.
CPC ...... *B23K 15/0093* (2013.01); *B23K 26/0006* (2013.01); *B23K 26/342* (2015.10); *B33Y 10/00* (2014.12); *B33Y 70/00* (2014.12); *C22C 26/00* (2013.01); *C22C 32/00* (2013.01); *B22F 2304/054* (2013.01); *B22F 2304/058* (2013.01); *B22F 2998/10* (2013.01); *B29C 64/153* (2017.08); *B82Y 40/00* (2013.01); *C22C 2026/001* (2013.01); *C22C 2026/002* (2013.01); *Y02P 10/295* (2015.11)

(58) Field of Classification Search
CPC ......... B22F 2304/058; B22F 2304/054; C22C 26/00; C22C 32/00; C22C 2026/001; C22C 2026/002; B23K 15/0093; B23K 26/342; B23K 26/0006; B82Y 40/00; Y02P 10/295; B29C 64/153
See application file for complete search history.

(56) References Cited

U.S. PATENT DOCUMENTS

2008/0069716 A1 3/2008 Chelluri et al.
2012/0085585 A1 4/2012 Scott et al.

OTHER PUBLICATIONS

No author, Thermal Conductivity of Metals, accessed online at https://www.engineeringtoolbox.com/thermal-conductivity-metals-d_858.html on Sep. 22, 2018 (Year: 2018).*

Extended European Search Report for EP Application No. 15740003.7, dated Oct. 9, 2017, 14 pages.

D. Gu et al., "Nanocrystalline TiC Reinforced Ti Matrix Bulk-Form Nanocomposites by Selective Laser Melting (SLM): Densification, Growth Mechanism and Wear Behavior", from Composites Science and Technology 71, (2011) pp. 1612-1620.

A.R.P. Singh et al., "Bulk Nickel-Carbon Nanotube Nanocomposites by Laser Deposition", from Materials Science and Technology, Jul. 19, 2013, 9 pages.

D. Manfredi et aL, "Aluminum Matrix Composites (AMCs) by DMLS", Conference Paper, Oct. 2013, 6 pages.

Written Opinion and International Search Report, for PCT No. PCT/US2015/011061, dated Apr. 17, 2015, 12 pages.

International Preliminary Report on Patentability, for PCT Application No. PCT/US2015/011061, dated Jul. 26, 2016, 10 pages.

Communication Pursuant to Article 94(3) EPC from European Application No. 15740003.7, dated Jan. 4, 2019, 9 pages.

* cited by examiner

NANOPARTICLE ENHANCEMENT FOR ADDITIVE MANUFACTURING

BACKGROUND

The described subject matter relates generally to powder metallurgy, and more specifically to additive manufacturing employing metal powders.

Current approaches for additive manufacturing (AM) processes employing metal powders use the powder either as received, degassed (typically under vacuum or inert gas), or passivated (usually by surface oxidation). These parts produced by AM often suffer from distortion, porosity, and quality inconsistency, resulting in limited adoption and high process waste.

Iron nanoparticles have been used in a liquid binder to facilitate improved part quality in certain three-dimensional printing mechanisms, but this approach has not been demonstrated in other materials. The liquid phase binder is also counterproductive in creating metallic components using powder bed and direct spray apparatus utilizing laser or electron beams to consolidate materials. Thus the use of nanoparticles in powder bed and direct spray apparatus have been limited to the addition of metal or carbon nanoparticles to thermoplastics. These nanoparticle-containing thermoplastics would need to operate as models for wax molds in which metallic parts are only formed indirectly (e.g., via casting).

SUMMARY

A method for making a bulk material includes providing a plurality of metallic particulates and arranging a plurality of nanoparticles interstitially between adjacent ones of the plurality of metallic particulates. An energy beam is applied to the combination of metallic particulates and nanoparticles. The metallic particulates and the nanoparticles are consolidated into a first bulk layer.

A method for operating an additive manufacturing apparatus includes providing a plurality of first metallic particulates having a mean particle diameter of more than about 300 nm. A plurality of first nanoparticles are arranged interstitially between adjacent ones of the plurality of metallic particulates, the nanoparticles having a characteristic dimension of less than about 100 nm. The first metallic particulates and first nanoparticles are placed onto or proximate to a working surface of the additive manufacturing apparatus. An energy beam is directed selectively over the first metallic particulates and the first nanoparticles to form a first molten powder pool. At least a portion of the first molten powder pool is solidified to form a build layer on a first deposition surface.

DETAILED DESCRIPTION

Figure 1A:
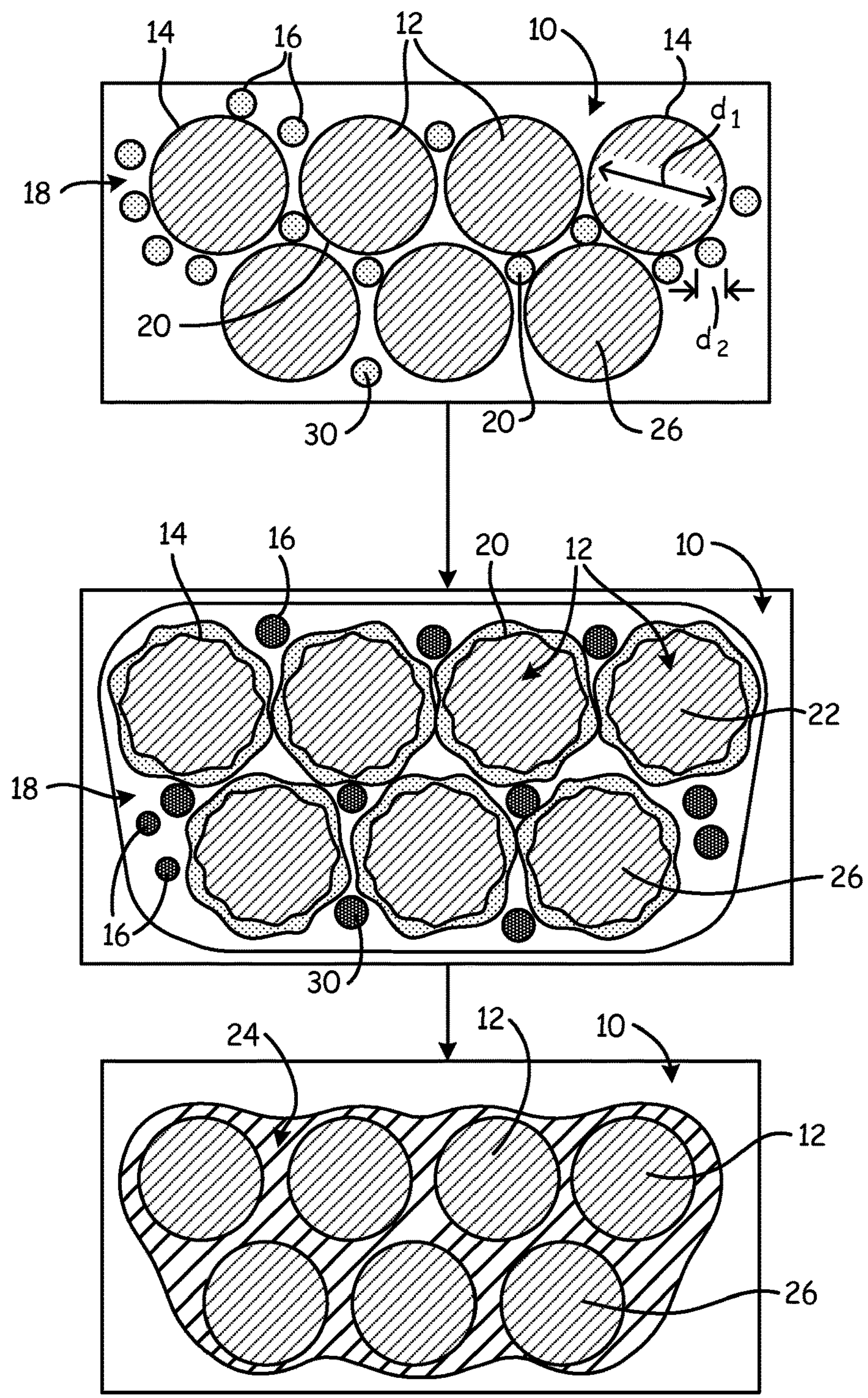
FIG. 1A schematically shows an example metallic powder being provided with an interstitial alloy.

FIG. 1A shows provided metallic first particulates 12 of powder material 10. First particulates 12 have first mean diameter $d_1$. Nanoparticles 16 of a supplemental nanomaterial 18 have a second mean diameter $d_2$, in which $d_2$ is generally less than first mean diameter $d_1$. Nanoparticles 16 of supplemental nanomaterial 18 can have a different composition than first particulates 12 to provide enhanced heat transfer and bonding during consolidation of metallic powder material 10. This results in a higher quality part by forming one or more interstitial compositions.

First particulates 12 of powder material 10 are generally metallic and are intended for use, for example, in an additive manufacturing process to form one or more layers of a bulk metallic, composite, or hybrid material. Due to the relatively large size and nonuniform shape of metallic first particulates 12, it may be difficult to consolidate them about irregular and spaced apart particulate outer portions 14.

To facilitate use of metallic particulates in additive manufacturing processes utilizing a powder bed or direct spray, a plurality of metallic first particulates 12 can have a mean particle diameter of more than about 300 nm. In this way, the entirety of the particulates need not be heated and reheated with each pass of the energy beam(s) as described below. However, large metallic particulates can be irregularly shaped and sized, leaving large interstices 20 between particulates 12 and making it difficult to ensure even heat flow between them. This is generally due to relatively low thermal conductivity of the inert interstitial atmosphere, and results in unpredictable shrinkage and porosity of the finished parts. Even when sufficient energy is provided and transmitted between particulates 12, interstices 20 are normally filled by molten material from consolidation of particulates 12, contributing to substantial part shrinkage and/or porosity.

Figure 1B:
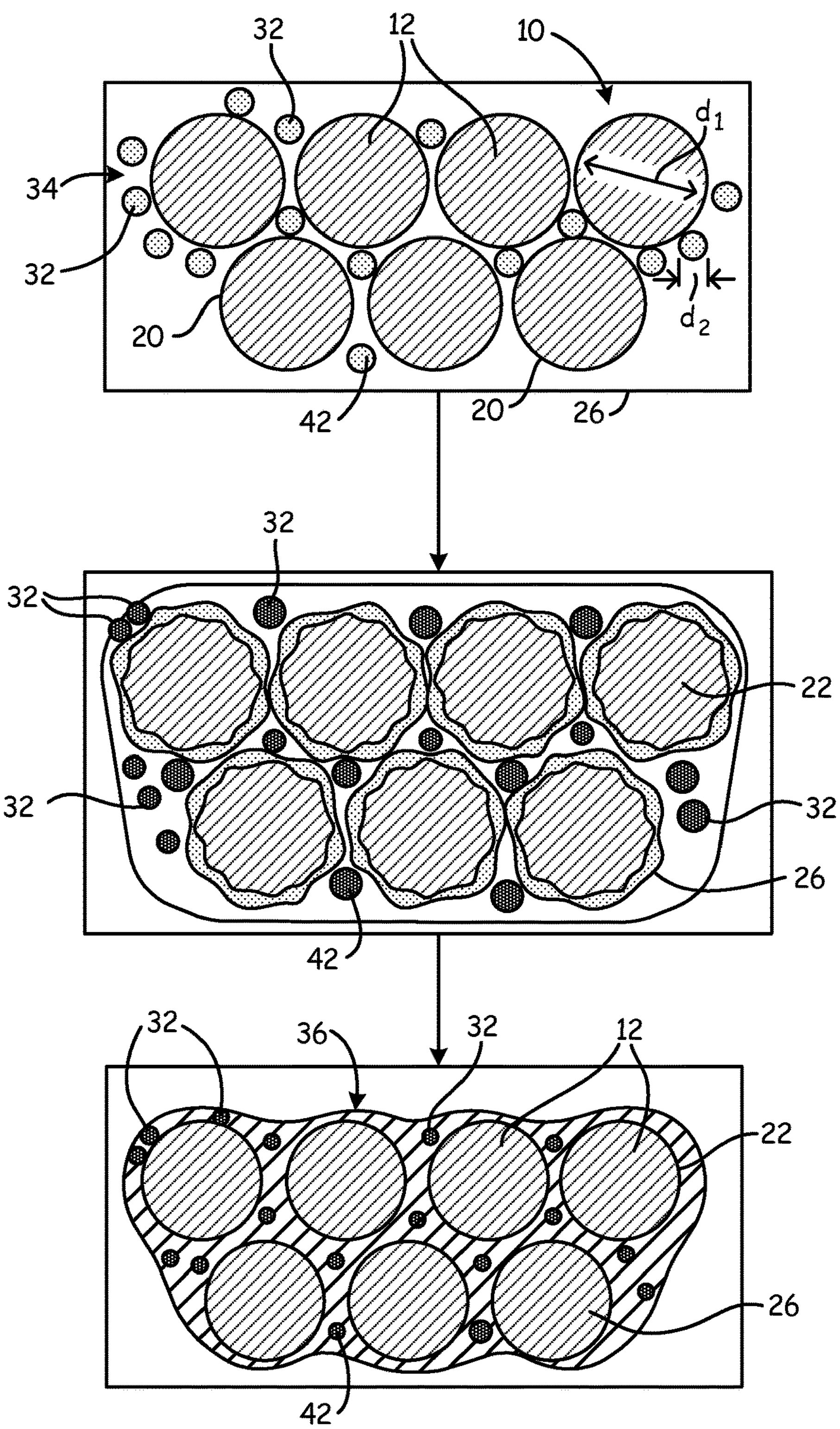
FIG. 1B schematically shows an example metallic powder being provided with an interstitial nanocomposite.

In response, at least a plurality of first nanoparticles 16 can be arranged interstitially between adjacent ones of the plurality of metallic particulates 12. To facilitate this, a mean characteristic or primary dimension of nanoparticles can be less than about 100 nm, depending on their configuration as described below. Then when an energy beam is applied to the combination of metallic first particulates 12 and nanoparticles 16 (see, e.g., FIGS. 2 and 3), they are consolidated into a first bulk layer with one or more interstitial compositions. Depending on the compositions of the particulates and nanoparticles, the interstitial composition will either be an interstitial alloy 24 (FIG. 1A) or an interstitial nanocomposite 36 (FIG. 1B)

Figure 2:
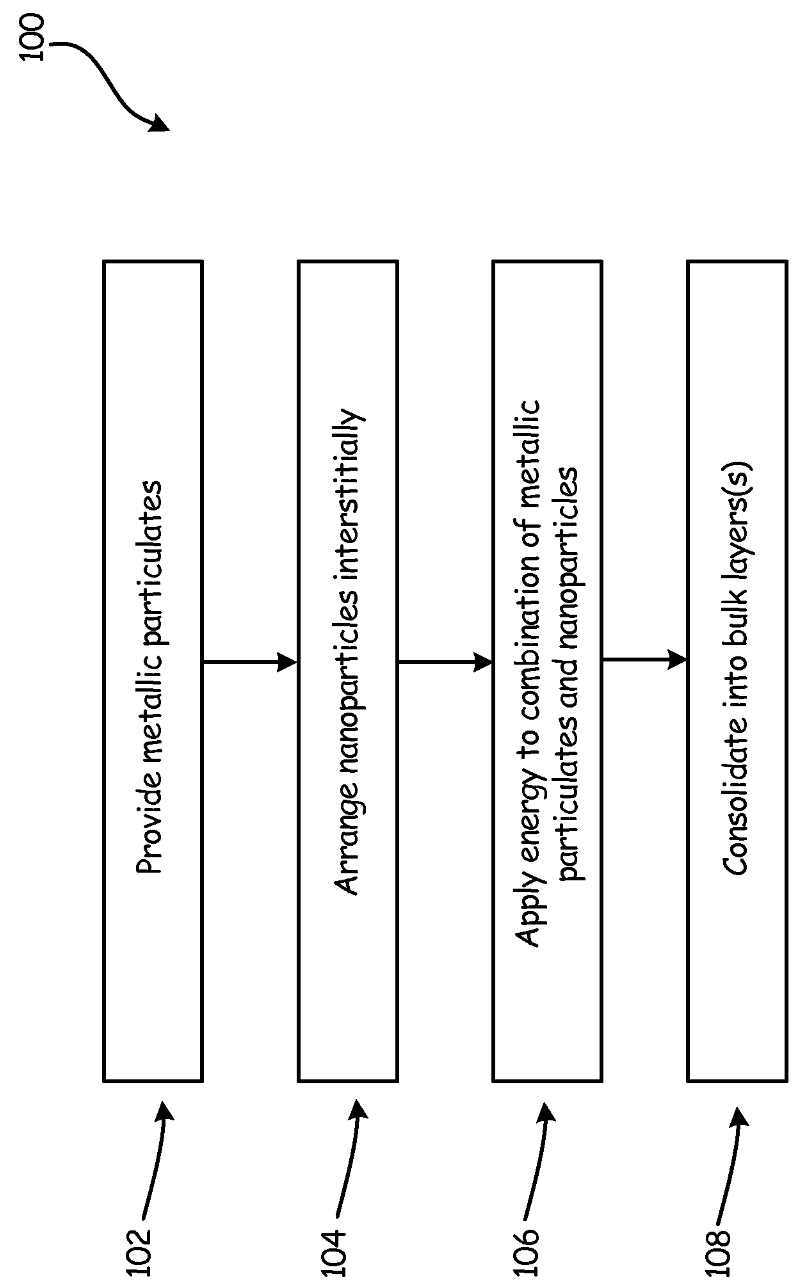
FIG. 2 is an example flow chart for forming layers of a bulk material.
Figure 3:
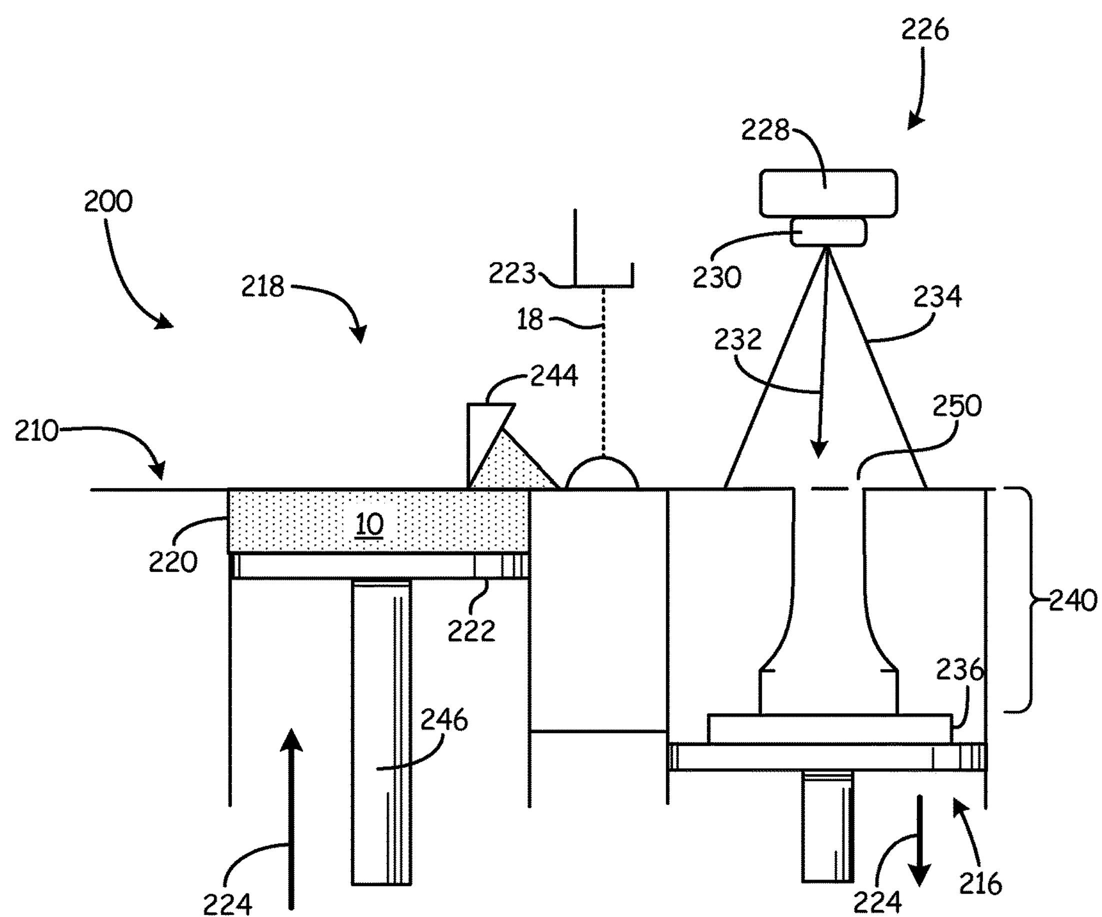
FIG. 3 is an example additive manufacturing apparatus for making a bulk material.

Energy can be applied in various forms such as one or more laser beams or electron beams as discussed with respect to illustrative examples of FIGS. 2 and 3. Energy can be applied to at least some of metallic first particulates 12 and nanoparticles 16 so as to selectively heat these areas in and around nanomaterial 18, while leaving at least internal portions 22 of first particles 12 effectively unmelted. At least some of nanoparticles 16 can form interstitial alloy 24 with at least outer portions 14 of metallic first particulates 12. When alloyed with outer portion 14 of metallic particulates 12, nanoparticles 16 can thus generally introduce or beneficially modify a particular property to interstitial alloy 24 around first particulates 12. For example, nanoparticles 16 and/or interstitial alloy 24 can have a thermal conductivity value greater than a thermal conductivity value of first particulates 12.

In addition to first particulates 12 and first nanoparticles 16, optional second and subsequent particulates 26 of a second metallic material and/or optional second and subsequent nanoparticles 30 of a second nanomaterial can additionally and/or alternatively be employed as shown in FIG.

1A. This can provide, for example, a graded composition of either the metallic composition and/or the interstitial alloy.

FIG. 1B shows an alternative embodiment in which insoluble nanoparticles 32 of supplemental nanomaterial 34 are combined with metallic particulates 12. This combination can form interstitial nanocomposite 36 around remaining portions of metallic particulates 12. Instead of forming interstitial alloy(s) 24 as shown in FIG. 1A, insoluble nanoparticles 32 can instead be suspended interstitially in interstitial matrix 38 after one or more bulk manufacturing or consolidation processes.

A process for forming such an arrangement can be similar to that which is described with respect to FIG. 1A. In lieu of soluble nanoparticles 16, second supplemental nanomaterial 34 can include insoluble nanoparticles 32 disposed interstitially between first particulates 12 prior to application of the energy beam(s) (see, e.g., FIGS. 2 and 3). In certain embodiments, insoluble nanoparticles 32 can include various types of carbon nanoparticles and/or ceramic nanoparticles (or precursors thereof). The composition of a precursor will depend on the bulk material being formed and the selected process, as some additive processes require a solid binder and/or an alternative chemical form which will be converted by the additive process into the desired particulate or nanoparticle composition.

In certain alternative embodiments, nanoparticles 32 can additionally or alternatively include a metal which is partially or completely insoluble in interstitial matrix 38. It will be recognized that interstitial matrix 38 can have a similar or identical composition as compared to metallic particulates 12, depending on the presence of alloying nanoparticles 16 (shown in FIG. 1).

Similar to FIG. 1A, optional second or subsequent metallic particulates 26 and/or optional second or subsequent nanoparticles 42 can additionally and/or alternatively be employed as shown in FIG. 1B. As in the previous example, this can result in a graded composition of either the bulk metallic composition and/or interstitial composite 36.

Referring to both FIGS. 1A and 1B, there are multiple possible compositions of metallic particulates 12, 26, and/or nanoparticles 16, 32, 42. In certain embodiments, one or more of metallic particulates 12, 26 can include a respective first and/or second metallic material selected from a group consisting of: nickel, titanium, aluminum, and alloys thereof. Similarly, the composition of one or more of nanoparticles 16, 32, 42 can optionally include a metallic, ceramic, and/or carbon material.

FIG. 2 shows steps of method for making a bulk material from a metallic powder. Method 100 includes step 102 in which particulates of one or more metallic powders are provided, followed by step 104, where nanoparticles of one or more nanomaterials are added to the metallic powder(s) and arranged interstitially with the metallic particulates.

Generally speaking, a mean particle diameter of the first particles is greater than a mean particle diameter of the second particles to facilitate the combination of materials and to ensure that the bulk properties are not unduly compromised by the interstitial composition formed subsequently. In certain embodiments, the metallic particulates can have a mean diameter of more than about 300 nm, while the nanoparticles, additionally and/or alternatively, can have a characteristic or primary dimension of less than about 100 nm. Since nanoparticles come in a variety of configurations other than generally spherical powder particles, the primary or characteristic dimension can be one such as the cross-sectional diameter of the nanotube or nanowire.

In step 106, energy is added to at least the second powder so as to selectively heat the second particles. As a result of this step, at least some of the second particles are converted into a partial or complete molten state so that they can help form one or more interstitial compositions (examples shown in FIGS. 1A and 1B). In certain embodiments, the second particles are actually precursor compositions, and break down into an alloying element or a protective composition upon the application of sufficient energy.

Nanoparticles can be selected to provide effective mixing and even coverage of the larger metallic particulates to form one or more interstitial composition(s) therebetween. For example, nanoparticles and/or interstitial composition(s) can have a thermal conductivity value greater than a thermal conductivity value of the metallic particulates. Nanoparticle size, composition, and distribution can thus be selected with relative thermal conductivity so as to aid heat dissipation in laser- or electron-beam treated metal particle streams or powder beds (example apparatus shown in FIG. 3). Better heat flow control allows defect and distortion reduction, reaction and microstructure control, and denser parts.

In one example, the first powder can be a metallic material (or precursor) selected from a group consisting of: nickel, titanium, aluminum, and alloys thereof. Compositions of the nanoparticles can include a metallic nanomaterial with varying degrees of solubility in the composition(s) formed by molten portions of the metallic particulates. As noted above, in certain embodiments, a composition of a metallic nanomaterial can include an alloying element (or precursor) which is compatible with and at least partially soluble in the first metallic material. This combination provides an interstitial alloy which can help facilitate deposition and/or bonding of the first powder as a bulk material, while ensuring that many of the resulting bulk material properties are maintained based on the substantially identical interior portion of the modified particles. To further minimize effects on the bulk material, the alloying element can be selected to be inert to one or more properties of the bulk material in small concentrations.

Additionally and/or alternatively, metallic nanoparticles can have limited or minimal solubility in the composition formed by the metallic particulates. At least some of the nanoparticles can include a carbon or ceramic nanomaterial which is selected from: nanowire, nanotubes, graphene, and combinations thereof. A composition of the plurality of carbon or ceramic nanoparticles can have varying degrees of solubility in different metallic compositions such that a combination of molten portions of metallic particulates and the nanomaterial forms an interstitial nanocomposite with a reinforcement nanostructure supported by a metallic matrix. Nonlimiting examples of ceramic nanomaterials include boron nitride, silicon carbide, and combinations thereof.

In one instance, step 108 includes consolidating the modified particles into one or more bulk layers. Generally, the modified particles can be disposed onto a working surface of an additive manufacturing apparatus or other platform. An illustrative example of this process is shown with respect to FIG. 3.

FIG. 3 schematically illustrates operation of additive manufacturing apparatus 200 to form at least part of a bulk material, and in which metallic particulates are combined with nanoparticles to make a bulk material with at least one interstitial composition. FIG. 3 shows only one non-limiting example of a powder bed type additive manufacturing process and apparatus, and is not meant to limit the described subject matter to a single process or machine. Embodiments of apparatus 200 can include various additive manufacturing processes utilizing a laser or electron beam, such as but not limited to, direct laser sintering (DLS) manufacturing, direct laser melting (DLM) manufacturing, selective laser sintering (SLS) manufacturing, selective laser melting (SLM) manufacturing, laser engineering net shaping (LENS) manufacturing, electron beam melting (EBM) manufacturing, direct metal deposition (DMD) manufacturing, and others known in the art.

Build table 210 includes movable build platform 216, which can be any object which is capable of being mounted to additive manufacturing apparatus 200 for building one or more near-net shape components. Powder delivery system 218 is capable of supplying successive quantities of metallic particulates or other powders to build platform 216. In this example, powder delivery system 218 includes powder compartment 220 with powder elevator platform 222 disposed proximate to, and movable opposite build platform 216. Build arrows 224 indicate that powder elevator platform 222 is movable in a first vertical direction, and build platform 216 is movable in a second vertical direction opposite the first vertical direction. However, it will be appreciated that other powder supply arrangements can be used such as those where the metal powder is injected into an energy beam before it reaches the intended working surface (e.g., build platform 216).

FIG. 3 also shows a non-limiting example of energy beam apparatus 226 with beam generator 228 and outlet lens 230 adapted to steer energy beam 232 generally along beam path 234 toward build platform 216. This example is simplified for brevity, and it will therefore be understood that other more complex electron or laser beam configurations (e.g., steering mirrors, prisms, and/or multi-axis CNC systems) can be incorporated to operate other embodiments of energy beam apparatus 226.

FIG. 3 also shows powder bed build plate 236 disposed on build platform 216 to serve as a substantial portion of an initial working surface for build assembly 240. After applying energy to combined first powder and second powder materials 10, 18 with energy beam 232 solidifying at least a portion of the first molten powder pool to form a build layer on a first deposition surface. A plurality of successively deposited powder build layers are provided from powder supply 242 by recoater 244 to build assembly 240.

In the example shown in FIG. 3, operation of apparatus 200 can begin with providing metallic particulates 12 to a working surface (e.g., movable build platform 216) of additive manufacturing apparatus 200. Nanoparticles 16 can be added to the working surface as well via powder injector 223 or other suitable device for arranging nanoparticles 16 interstitially between metallic particulates 12 (best seen in FIGS. 1A and 1B).

During or after the arranging of nanoparticles (e.g., via agitation or simultaneous spraying), the first metallic particulates and first nanoparticles are placed onto or proximate a working surface of the additive manufacturing apparatus. In the example of FIG. 3, this can be done using recoater 244 or other suitable apparatus. However, it will be recognized that some of the above processes utilize direct powder spray in or around energy beam 232.

The combined powder is then energized by directing one or more energy beams selectively over the first metallic particulates and the first nanoparticles to form a first molten powder pool. Upon solidification of the pool, the particulates and nanoparticles are consolidated into one or more bulk layers having a metallic portion and an interstitial composition (alloy and/or nanocomposite) therebetween.

As noted with respect to FIGS. 1A and 2, at least some of the nanoparticles can form an alloy with at least an outer portion of the metallic particulates. Similarly, some or all of the nanoparticles can be supported by a metallic matrix in a nanocomposite formed with at least an outer portion of the metallic particulates. Thus a composition of the plurality of first metallic particulates can include a first metallic material selected from a group consisting of: iron, nickel, titanium, aluminum, and alloys thereof. A composition of the nanoparticles can include a metallic nanomaterial, a carbon nanomaterial, and/or a ceramic nanomaterial. The carbon nanomaterial can be selected from: nanowire, nanotubes, graphene, and combinations thereof.

In certain embodiments, multiple types of metallic particulates and/or nanomaterials can be provided. The composition of each may be different, for example, to produce a graded metallic or nanocomposition in the bulk material.

Each build layer can be converted into successively formed component build layers according to a computer model, which can be stored in an STL memory file or other electronic data file accessible by a controller (not shown) of additive manufacturing apparatus 200. Selective areas of each successive deposited layer can be sintered or otherwise adhered to the preceding layer by energy beam 232. After each successive layer, recoater 244 is returned to a starting position near elevator platform 222, while supply piston 246 advances upward to expose another layer from powder supply 242, while build platform 216 indexes down by approximately one layer thickness. Generally, each successive iteration of first and second deposition surface(s) includes at least a portion of a preceding build layer 250. There may be some overhang and discontinuities, depending on the final build requirements and the capabilities of the build apparatus. The process is repeated until build assembly 240 is complete with one or more near-net shape components built in a layerwise manner. Thus by iteratively performing the above described steps, a plurality of build layers can be formed. As a result, a deposition surface can be a subsequent deposition surface including at least one previously solidified build layer.

Discussion of Possible Embodiments

The following are non-exclusive descriptions of possible embodiments of the present invention.

A method for making a bulk material includes providing a plurality of metallic particulates and arranging a plurality of nanoparticles interstitially between adjacent ones of the plurality of metallic particulates. An energy beam is applied to the combination of metallic particulates and nanoparticles. The metallic particulates and the nanoparticles are consolidated into a first bulk layer.

The method of the preceding paragraph can optionally include, additionally and/or alternatively, any one or more of the following features, configurations and/or additional components:

A method for making a bulk material according to an exemplary embodiment of this disclosure, among other possible things includes providing a plurality of metallic particulates; arranging a plurality of nanoparticles interstitially between adjacent ones of the plurality of metallic particulates; applying an energy beam to the combination of metallic particulates and nanoparticles; and consolidating the metallic particulates and the nanoparticles into a first bulk layer.

A further embodiment of the foregoing method, wherein at least some of the nanoparticles form an alloy with at least an outer portion of the metallic particulates.

A further embodiment of any of the foregoing methods, wherein a composition of the plurality of metallic particulates comprises a first metallic material selected from a group consisting of: iron, nickel, titanium, aluminum, and alloys thereof.

A further embodiment of any of the foregoing methods, wherein the composition of the plurality of metallic particulates comprises a second metallic material different from a first metallic material.

A further embodiment of any of the foregoing methods, wherein a composition of the plurality of nanoparticles comprises a metallic nanomaterial.

A further embodiment of any of the foregoing methods, wherein the composition of the metallic nanomaterial includes an alloying element which is at least partially soluble in the first metallic material.

A further embodiment of any of the foregoing methods, wherein a composition of the plurality of nanoparticles comprises a carbon nanomaterial.

A further embodiment of any of the foregoing methods, wherein the carbon nanomaterial is selected from: nanowire, nanotubes, graphene, and combinations thereof.

A further embodiment of any of the foregoing methods, wherein a composition of the plurality of nanoparticles comprises a ceramic nanomaterial.

A further embodiment of any of the foregoing methods, wherein the combination of the metallic particulates and the ceramic nanomaterial forms a nanocomposite with a ceramic reinforcement nanostructure supported by a metallic matrix.

A further embodiment of any of the foregoing methods, wherein the metallic particulate material has a first thermal conductivity and the nanoparticles have a second thermal conductivity different from the first thermal conductivity.

A further embodiment of any of the foregoing methods, wherein the metallic particulates have a mean particle diameter of more than about 300 nm, and the nanoparticles have a characteristic dimension of less than about 100 nm.

A method for operating an additive manufacturing apparatus includes providing a plurality of first metallic particulates having a mean particle diameter of more than about 300 nm. A plurality of first nanoparticles are arranged interstitially between adjacent ones of the plurality of metallic particulates, the nanoparticles having a characteristic dimension of less than about 100 nm. The first metallic particulates and first nanoparticles are placed onto or proximate to a working surface of the additive manufacturing apparatus. An energy beam is directed selectively over the first metallic particulates and the first nanoparticles to form a first molten powder pool. At least a portion of the first molten powder pool is solidified to form a build layer on a first deposition surface.

The method of the preceding paragraph can optionally include, additionally and/or alternatively, any one or more of the following features, configurations and/or additional components:

A method for operating an additive manufacturing apparatus manufacturing a component according to an exemplary embodiment of this disclosure, among other possible things includes (a) providing a plurality of first metallic particulates having a mean particle diameter of more than about 300 nm; (b) arranging a plurality of first nanoparticles interstitially between adjacent ones of the plurality of metallic particulates, the nanoparticles having a characteristic dimension of less than about 100 nm; (c) placing the first metallic particulates and first nanoparticles onto or proximate to a deposition surface of the additive manufacturing apparatus; (d) directing an energy beam selectively over the first metallic particulates and the first nanoparticles to form a first molten powder pool; (e) solidifying at least a portion of the first molten powder pool to form a build layer on the deposition surface.

A further embodiment of the foregoing method, wherein the deposition surface is a subsequent deposition surface comprising at least one previously solidified build layer.

A further embodiment of any of the foregoing methods, further comprising: iteratively performing steps (a)-(e) to form a plurality of build layers.

A further embodiment of any of the foregoing methods, wherein at least some of the first nanoparticles form an alloy with at least an outer portion of the first metallic particulates.

A further embodiment of any of the foregoing methods, wherein a composition of the plurality of first metallic particulates comprises a first metallic material selected from a group consisting of: iron, nickel, titanium, aluminum, and alloys thereof.

A further embodiment of any of the foregoing methods, further comprising: providing a plurality of second metallic particulates having a mean particle diameter of more than about 300 nm; wherein a composition of the plurality of second metallic particulates comprises a second metallic material different from the first metallic material.

A further embodiment of any of the foregoing methods, wherein a composition of the first nanoparticles comprises at least one of: a metallic nanomaterial, a carbon nanomaterial, and a ceramic nanomaterial.

A further embodiment of any of the foregoing methods, wherein the carbon nanomaterial is selected from: nanowire, nanotubes, graphene, and combinations thereof.

A further embodiment of any of the foregoing methods, wherein the combination of the metallic particulates and the first nanoparticles forms a nanocomposite with a reinforcement nanostructure supported by a metallic matrix.

A further embodiment of any of the foregoing methods, further comprising: providing a plurality of second nanoparticles having a characteristic dimension of less than about 100 nm; wherein a composition of the plurality of second nanoparticles comprises a second nanomaterial different from the first nanomaterial.

Although the present invention has been described with reference to preferred embodiments, workers skilled in the art will recognize that changes may be made in form and detail without departing from the spirit and scope of the invention.

The invention claimed is:

1. A method for making a bulk material, the method comprising:

providing a plurality of metallic particulates onto or proximate to a deposition surface, wherein the plurality of metallic particulates comprises a first metallic material selected from a group consisting of nickel and alloys thereof;

arranging a plurality of nanoparticles interstitially between adjacent ones of the plurality of metallic particulates, wherein the plurality of nanoparticles comprises a material selected from the group consisting of a ceramic nanomaterial and graphene;

applying an energy beam to the combination of metallic particulates and nanoparticles to consolidate the metallic particulates and the nanoparticles into a first bulk layer; and iteratively performing the steps of providing a plurality of metallic particulates, arranging a plurality of nanoparticles, and applying an energy beam to form a plurality of bulk layers.

2. The method of claim 1, wherein the composition of the plurality of metallic particulates comprises a second metallic material different from the first metallic material.

3. The method of claim 1, wherein the plurality of nanomaterials comprises graphene.

4. The method of claim 1, wherein the plurality of nanoparticles comprises the ceramic nanomaterial.

5. The method of claim 4, wherein the combination of the metallic particulates and the ceramic nanomaterial forms a nanocomposite with a ceramic reinforcement nanostructure supported by a metallic matrix.

6. The method of claim 5, wherein the ceramic nanomaterial is selected from the group consisting of silicon carbide, boron nitride, and combinations thereof.

7. The method of claim 1, wherein the metallic particulate material has a first thermal conductivity and the nanoparticles have a second thermal conductivity different from the first thermal conductivity.

8. The method of claim 1, wherein the metallic particulates have a mean particle diameter of more than about 300 nm, and the nanoparticles have a characteristic dimension of less than about 100 nm.

9. A method for operating an additive manufacturing apparatus, the method comprising:

(a) providing a plurality of first metallic particulates having a mean particle diameter of more than about 300 nm;

(b) arranging a plurality of first nanoparticles interstitially between adjacent ones of the plurality of first metallic particulates, the first nanoparticles having a characteristic dimension of less than about 100 nm and wherein a composition of the plurality of first nanoparticles comprises a metallic nanomaterial;

(c) placing the first metallic particulates and first nanoparticles onto or proximate to a deposition surface of the additive manufacturing apparatus;

(d) directing an energy beam selectively over the first metallic particulates and the first nanoparticles to selectively melt the plurality of first nanoparticles to form a first molten powder pool while leaving internal portions of the first metallic particulates unmelted;

(e) solidifying at least a portion of the first molten powder pool to form a build layer on the deposition surface.

10. The method of claim 9, wherein the deposition surface is a subsequent deposition surface comprising at least one previously solidified build layer.

11. The method of claim 9, further comprising:

iteratively performing steps (a)(e) to form a plurality of build layers.

12. The method of claim 9, wherein at least some of the first nanoparticles form an alloy with at least an outer portion of the first metallic particulates.

13. The method of claim 12, wherein the first metallic particulates comprise a first metallic material and wherein the composition of the metallic nanomaterial includes an alloying element which is at least partially soluble in the first metallic material.

14. The method of claim 9, wherein a composition of the plurality of first metallic particulates comprises a first metallic material selected from a group consisting of nickel and alloys thereof.

15. The method of claim 9, further comprising:

providing a plurality of second metallic particulates having a mean particle diameter of more than about 300 nm;

wherein a composition of the plurality of second metallic particulates comprises a second metallic material different from the first metallic material.

16. The method of claim 9, further comprising:

providing a plurality of second nanoparticles having a characteristic dimension of less than about 100 nm;

wherein a composition of the plurality of second nanoparticles comprises a second nanomaterial different from the first nanomaterial.

17. The method of claim 9, wherein the first metallic particulates have a first thermal conductivity and the first nanoparticles have a second thermal conductivity different from the first thermal conductivity.

18. The method of claim 17, wherein the second thermal conductivity is greater than the first thermal conductivity.

* * * * *